United States Patent
Chartrain et al.

[11] Patent Number: 5,162,628
[45] Date of Patent: Nov. 10, 1992

[54] SUPPORT MEANS FOR A SPIT IN AN ELECTRIC OVEN WITH COMBINED MICROWAVE AND RESISTANCE HEATING

[75] Inventors: Pierre Chartrain, Bourguebus; Oliver H. J. Gensbittel, Malissard; Daniel F. Dubois, Caen, all of France

[73] Assignee: Moulinex (Societe Anonyme), Bagnolet, France

[21] Appl. No.: 682,539

[22] Filed: Apr. 9, 1991

[30] Foreign Application Priority Data

Apr. 9, 1990 [FR] France ................. 90 04540

[51] Int. Cl.⁵ .................. H05B 6/80; F24C 15/18
[52] U.S. Cl. ..................... 219/10.55 E; 219/10.55 F; 99/421 H; 99/444; 99/DIG. 14
[58] Field of Search ............ 219/10.55 E, 10.55 F, 219/10.55 R; 99/419, 421 R, 421 H, 410–415, 426, 427, 443 R, 444, 446, 447, 448, 450, DIG. 14

[56] References Cited

U.S. PATENT DOCUMENTS

| | | | |
|---|---|---|---|
| 4,074,102 | 2/1978 | Asen | 219/10.55 E |
| 4,458,585 | 7/1984 | Erbach | 99/419 |
| 4,709,626 | 12/1987 | Hamlyn | 99/426 |
| 4,952,764 | 8/1990 | Harrington | 219/40.55 E |

Primary Examiner—Philip H. Leung
Attorney, Agent, or Firm—Young & Thompson

[57] ABSTRACT

Support for a spit (1) mounted on a drippings pan (2) and comprising two opposite supports (3) each insulated from the drippings pan by an insulating base (5) comprising a head (7) that rests on a margin (8) of the drippings pan. At least one foot (9, 10) passes through a corresponding opening (12, 13) of the drippings pan. Each opening comprises a skirt (14), and the height (h) and the section (s1, s2) of the foot are dimensioned as a function of the section (a1, a2) of the opening such that, during swinging of the support about a horizontal axis (15-16-17) by pressing of the head on the margin of the drippings pan, a region (19-20-21) of the foot opposite that axis will come to bear against the skirt, thereby preventing the foot from leaving the opening. Application to ovens with combined microwave and resistance heating.

4 Claims, 1 Drawing Sheet

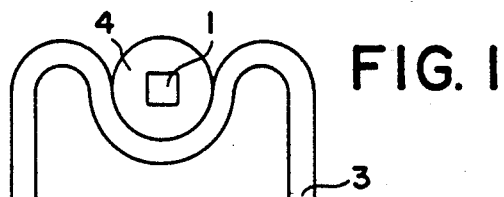
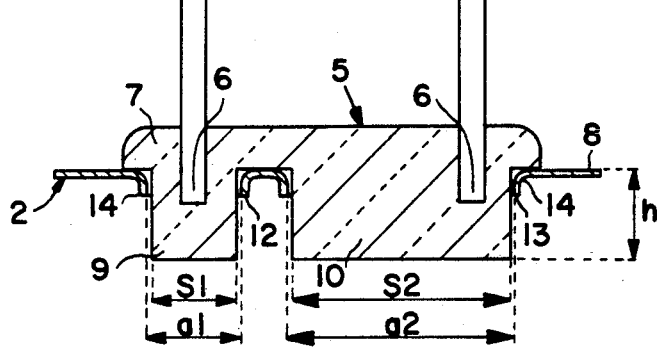
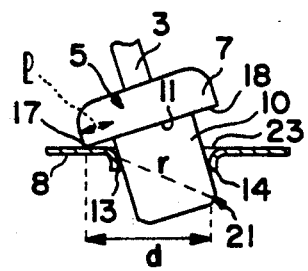
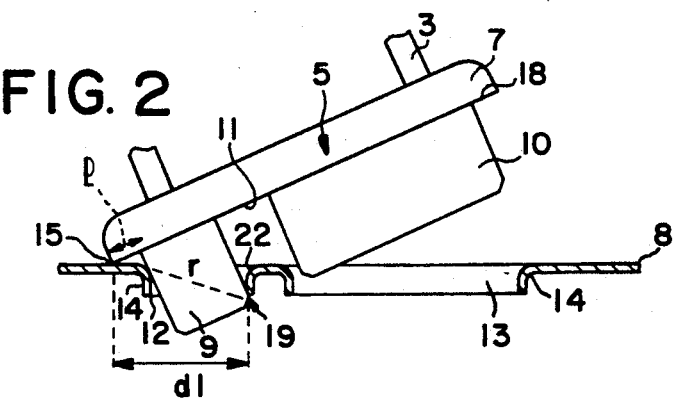
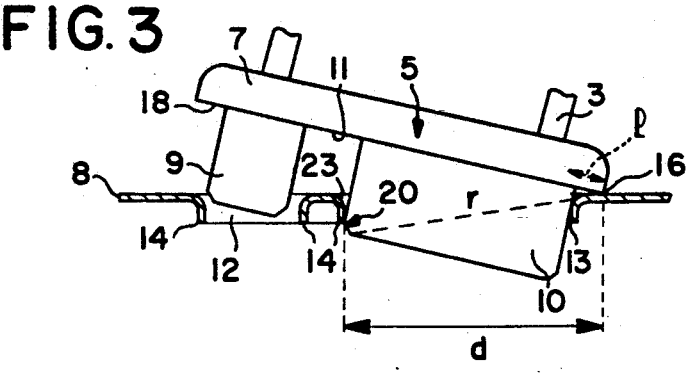

SUPPORT MEANS FOR A SPIT IN AN ELECTRIC OVEN WITH COMBINED MICROWAVE AND RESISTANCE HEATING

The invention relates to a support means for a spit adapted to be mounted on the drippings pan of an electric oven with combined microwave and resistance heating, and comprising two opposite supports which are insulated each, on the one hand, from the spit by an insulating ring which is traversed by the spit, and, on the other hand, from said drippings pan by an insulating base comprising a head which is adapted to rest on a margin of the drippings pan, and at least one foot with a surface smaller than that of the lower surface of the head and adapted to pass through a corresponding opening of the drippings pan with slight peripheral play.

This type of support was described in U.S. Pat. application Ser. No. 638,458, filed Jan. 7, 1991. This application relates to an oven of the type comprising, in a chamber delimited by walls and a door, a drippings pan provided with such support means receiving a spit and adapted to occupy two positions, namely a cooking position in which the drippings pan is within the chamber and the spit is inserted in the axle of a rotating driver mounted on one of the walls, or a retracted position in which the drippings pan is at least partially outside the chamber and the spit is free from the drive.

The drawback of these support means that have been used is their tendency to unfasten. Thus, if one cooks for example a large fowl on the spit, the feet of the fowl can either brush against the walls, or jam in a support, which causes swinging of the spit from its normal position. This results in a pivoting of the insulating base which leaves the openings and which, in certain cases, is in danger of breaking, whereupon the support means and the spit fall.

The invention has for its object to overcome this drawback by preventing falling and breakage of the support means.

According to the invention, each opening comprising a downturned edge constituting a skirt, the height and the horizontal cross section of the foot are dimensioned as a function of the horizontal section of the opening such that, upon swinging of the support means about a horizontal axis by the bearing of a peripheral portion of the head on the flange of the drippings pan, a region of the foot opposite said axis comes into bearing against the skirt, thereby preventing the foot from leaving the opening.

Thus, thanks to the buttressing of the foot against the skirt, it is avoided during swinging that the foot will completely leave the openings. The limited swinging avoids the risk of breakage. This solution is particularly advantageous because it avoids adding a supplemental member adapted to maintain the base against the drippings pan, it is therefore economical and well adapted to mass production.

The characteristics and advantages of the invention will become more apparent from the description which follows, by way of example, with reference to the accompanying drawing, in which:

FIG. 1 is a view in section transverse to the spit of a support means according to the invention, mounted in openings of the drippings pan;

FIG. 2 shows in elevation the insulating base mounted in the openings of the drippings pan and in a position swung transversely to the left;

FIG. 3 is a view similar to FIG. 2 showing traverse swinging toward the right; and FIG. 4 is an axial view in elevation of the insulating base in an axially swung position.

The support means of the spit 1 shown in FIG. 1 is adapted to be mounted on a drippings pan 2 of an electric oven with combined microwave and resistance heating (not./shown) The drippings pan 2, as described in the above-identified application, comes to occupy a cooking position in the interior of the oven chamber (not shown), in which the spit 1 is on the axis of a rotatable drive (not shown) mounted on a wall of the chamber.

The support means comprises two opposite metallic supports 3 of U-shape which are insulated each, on the one hand, from the spit 1 by an insulating ring 4 of ceramic which is traversed by the spit 1, and, on the other hand, from said drippings pan 2 by an insulating base 5. Each support 3 is secured to the base 5 by cementing the ends 6 of its legs. Each insulating base 5 comprises a head 7 which is adapted to rest on a margin 8 of the drippings pan 2, and two feet 9, 10 of total horizontal cross section less than that of the lower surface 11 of the head 7 and adapted to pass each through a corresponding opening 12, 13 provided in the margin 8 of the drippings pan 2 with slight peripheral play. The insulating base 5 is preferably of a single piece of ceramic material of the type of steatite which is transparent to microwaves.

According to the invention, and as better shown in FIGS. 2, 3 and 4, each opening 12, 13 comprises a downwardly directed edge constituting a skirt 14, and the height h and the horizontal section s1, s2 of each foot 9, 10 are dimensioned as a function of the horizontal section a1, a2 of the corresponding opening 12, 13 such that, during swinging of the support means about a horizontal axis 15, 16, 17 by bringing to bear one peripheral portion 18 of the head 7 on the margin 8 of the drippings pan 2, a region 19-20-21 of the corresponding foot 9, 10 opposite said axis 15-16-17 comes to bear against the skirt 14, thereby preventing said foot, 9, 10 from leaving its opening 12, 13. Said axis 15, 16, 17 is materialized by a line of contact between the margin 8 of the drippings pan and the peripheral portion 18 of the head.

The swinging may be effected for example by brushing or catching of the spitted item on the walls of the chamber or on the supports 3. The swinging may be transverse to the axis of spit 1 (FIGS. 2 and 3) or axially of spit 1 (FIG. 4).

As will be understood, the swinging is limited, by the fact that the dimensions of each foot 9-10 are such that the radius of swinging r which is equal to the distance of the swinging axis 15-16-17 to the region 19-20-21 of the foot 9-10 farthest from the axis 15-16-17 is greater than the distance d between said axis 15-16-17 and the upper edge 22 of the opening 12-13 opposite the axle 15-16-17. The swinging radius r depends on the height h and section s1-s2 of the foot 9-10 and on the distance l between the axle 15-16-17 and the foot 9-10.

Steatite being a particularly onerous material, the height h or the section s1, s2 of the feet cannot be too great. When choosing the radius r slightly greater than the distance d between the axle 15, 16, 17 and the upper edge 22, 23 of the opening 12, 13, there should be sought an ideal compromise between the height and the section s1, s2 of the feet 9, 10. The piece will thus have a reasonable size and cost.

The insulating base 5 of the first support 3 comprises two spaced feet 9, 10 of different sizes (FIGS. 1 to 4), while the insulating base of the second support (not shown) comprises two spaced feet of the same size, so as to prevent reversal of the support means at the time of assembly by the user.

It is necessary in both cases that the feet 9, 10 each have a section s1, s2 sufficiently great to resist the forces particularly in the case of axial swinging in which the risk of breaking the feet 9, 10 is particularly great. To this end, an oblong section is preferably selected for at least one foot.

Tests have shown that an insulating base 5 having the following dimensions is particularly suitable for feet of different sizes:

height of feet: $h = 1.2$ cm
distance between swinging axis and foot: $l = 0.4$ cm
width of feet: 1.2 cm
respective lengths of the feet: 1.2 cm and 3.2 cm
respective lengths of the openings: 1.23 cm and 3.24 cm
width of the openings = 1.23 cm
height of the skirt: from 0.3 to 0.6 cm

What is claimed is:

1. In a support means for a spit (1) mounted on a drippings pan (2) of an electric oven with combined microwave and resistance heating, and comprising two opposed supports (3), an insulating ring (4) through which passes the spit (1), said insulating ring (4) insulating the supports (3) from the spit (1), an insulating base (5) comprising a head (7) which is adapted to rest on a margin (8) of the drippings pan (2), said insulating base (5) insulating the supports (3) from the drippings pan (2), the insulating base (5) comprising at least one foot (9, 10) of horizontal section (s1, s2) less than that of a lower surface (11) of the head (7) and adapted to pass through a corresponding opening (12, 13) of the drippings pan (2) with slight peripheral play; the improvement wherein each opening (12, 13) comprises a downwardly directed edge (14) constituting a skirt, the height (h) and the horizontal section s1, s2) of the foot (9, 10) being dimensioned as a function of the horizontal section (a1, a2) of the opening (12, 13) such that, during swinging of the support means about a horizontal axis (15, 16, 17) by pressing a peripheral portion (18) of the head (7) against the margin (8) of the drippings pan (2), a region (19-20-21) of the foot (9-10) opposite said axis (15-16-17) comes into bearing against the skirt (14), thereby preventing the foot (9, 10) from the opening (12, 13).

2. Support means according to claim 1, wherein the dimensions of the foot (9-10) are such that the radius of swinging (r) which is equal to the distance of the swinging axis (15-16-17) to the region (19-20-21) of the foot (9-10) farthest from the axis (15-16-17) is greater than the distance (d) between said axis (15-16-17) and the upper edge (22-23) of the opening (12-13) opposite the axis (15-16-17).

3. Support means according to claim 1, wherein the insulating base (5) of a first said support (3) comprises two feet (9, 10) of different sizes, while the insulating base of a second said support comprises two feet of the same size, so as to avoid reversal of the first and second support at the time of assembly.

4. Support means according to claim 1, wherein the insulating base (5) is made from a single piece of a ceramic material.

* * * * *